United States Patent
Matsue et al.

[11] Patent Number: 6,148,974
[45] Date of Patent: Nov. 21, 2000

[54] POWER TRANSMISSION SYSTEM FOR VEHICLE

[75] Inventors: Akira Matsue; Nobuaki Kawasaki, both of Komatsu, Japan

[73] Assignee: Komatsu Ltd., Tokyo, Japan

[21] Appl. No.: 09/304,825

[22] Filed: May 5, 1999

[30] Foreign Application Priority Data

May 13, 1998 [JP] Japan .................................. 10-146683

[51] Int. Cl.[7] .................................................. F16H 47/06
[52] U.S. Cl. ........................ 192/3.21; 192/70.13; 74/720
[58] Field of Search ............................... 192/3.21, 3.33, 192/70.13, DIG. 1; 74/720, 730.1

[56] References Cited

U.S. PATENT DOCUMENTS

| | | | |
|---|---|---|---|
| 3,006,199 | 10/1961 | Christenson et al. | 74/730.1 X |
| 3,029,662 | 4/1962 | Hause | 74/720 X |
| 3,447,397 | 6/1969 | Black et al. | 74/731.1 |
| 4,468,983 | 9/1984 | Vieth | 192/70.13 X |

*Primary Examiner*—Richard M. Lorence
*Attorney, Agent, or Firm*—Armstrong, Westerman, Hattori, McLeland & Naughton

[57] ABSTRACT

A modulating clutch unit and a torque converter unit are individually made attachable and detachable to provide a power transmission system for a vehicle with enhanced maintainability. For this purpose, in the power transmission system for a vehicle for transmitting power from an engine (1) to a traveling system by way of an input transfer unit (10) for distributing the power to a working machine power output section and a traveling power output section, via a modulating clutch unit (20), a torque converter unit (40), and a transmission (60), the modulating clutch unit (20) and the torque converter unit (40) are respectively placed at the engine (1) side and the transmission (60) side with the input transfer unit (10) therebetween, and are placed coaxially to be attachable and detachable.

4 Claims, 3 Drawing Sheets

POWER TRANSMISSION SYSTEM FOR VEHICLE

TECHNICAL FIELD

The present invention relates to a power transmission system for a vehicle which transmits power from an engine to a traveling system by way of an input transfer unit for distributing the power to a working machine power output section and a traveling power output section, via a modulating clutch unit, a torque converter unit, and a transmission. The invention particularly relates to a power transmission system for a vehicle in which a modulating clutch unit and a torque converter unit are respectively made to be assembly components in structure and individually attachable and detachable with maintainability being improved.

BACKGROUND ART

In a working vehicle such as a construction machine, power from an engine is divided into the one for a working machine, which drives a hydraulic pump, and the one for traveling, which drives a torque converter, by means of an input transfer unit for distributing the power. Usually, the distribution ratio is fixedly determined according to the gear of the input transfer unit. Depending upon the operations, however, the ratio of the power required of the working machine and the one required for traveling is not necessarily constant. Accordingly, in order to increase the operation efficiency, it is desired that more power is distributed to the working machine at a certain time, and more power is distributed for traveling at a certain time, by making the aforesaid distribution ratio variable. Conventionally, in order to make the input into the torque converter variable, it is disclosed that a variable input mechanism is provided between the engine and the torque converter, for example, in U.S. Pat. No. 3,447,397.

According to U.S. Pat. No. 3,447,397, a modulating clutch as a variable input mechanism is provided between an engine and a torque converter. A power transmission system provided with the modulating clutch will be explained in FIG. 3. Power of a gas turbine GT is sequentially transmitted to an accessory gear box AG, a speed reducer SR, a modulating clutch MC, a torque converter TC, and a transmission gear box GB. The modulating clutch MC is housed in a torque-converter housing F. The modulating clutch MC has a housing 84 provided with an input shaft 83. The housing 84 is supported by a bearing 84a attached to the torque-converter housing F and a bearing 84b attached to an output element 86, and composes an input section of the modulating clutch MC. Further, the housing 84 is engaged with or coupled to the output element 86 by means of a friction plate 85.

The output element 86 is provided with a pressure chamber 87 and an oil passage 88. Controlled pressure oil is supplied to the pressure chamber 87 via an adjusting valve 89. A piston 90 provided in the pressure chamber 87 is designed to compress the friction plate 85 with the pressure oil guided into the pressure chamber 87. The friction plate 85 is compressed in response to a pressure value of the pressure chamber 87 to change the transmission power of the modulating clutch MC. The terminal end of the output element 86 is fastened to a housing 91 of the torque converter TC with a bolt 91a. A gear 81 fixed at the housing 84 drives a hydraulic pump P via gears 81a and 81b. The hydraulic pump P serves as a pressure source of a hydraulic system of the entire power transmission system.

The torque converter TC is housed in the torque-converter housing F. The torque-converter housing F is divided into two parts, which are integrally fastened with a bolt 82. The torque-converter TC has the housing 91. The housing 91 is supported by bearings 92 and 93, and is driven by the output element 86 of the modulating clutch MC. The housing 91 has a pump blade 94. The pump blade 94 generates a flow in a ring circuit of the torque converter TC to rotate a turbine blade 95. The rotation of the turbine blade 95 is transmitted to an output shaft 96 coupled with a spline 96a to rotatively drive the output shaft 96.

The output shaft 96 is rotatably supported by a bearing 92 attached to the housing 91, and a bearing 92a attached to the torque-converter housing F. The torque converter TC has a stator blade 98 attached to a hub 97 via a one-way clutch 97a. A terminal end of the output shaft 96 is coupled to an input shaft 99 of the transmission gear box GB via a joint 96b. The transmission gear box GB converts the rotational frequency of the input shaft 99 into the rotational frequency in the forward second and the rearward second gears, and outputs each frequency to an output shaft 100 by operating double clutches C and C1.

In the above configuration, the modulating clutch MC and the torque converter TC are integrally assembled in series with a bolt 91a, and housed and fixed in the torque-converter housing F.

However, since the modulating clutch MC and the torque converter TC are housed in the torque-converter housing F and integrally assembled in series, when each of them is repaired, maintained, or checked, it is necessary to disassemble the torque-converter housing F after the torque-converter housing F is detached. In addition, after disassembling, it is necessary to individually replace the modulating clutch MC or the torque converter TC, thereby causing the disadvantage that the number of man-hours required for replacement increases, and maintainability is reduced. When it becomes necessary to replace the modulating clutch with a modulating clutch unit with different clutch capacity, a change of design is required in the adjacent portions since the size thereof is changed, which actually results in new production, therefore causing the disadvantage of being uneconomical.

SUMMARY OF THE INVENTION

Mitigating the aforesaid conventional disadvantages, an object of the present invention is to provide a power transmission unit for a vehicle in which a modulating clutch unit and a torque converter unit are individually attachable and detachable to and from an input transfer unit for dividing the power from an engine into the power for a working machine and the one for traveling to enhance the maintainability and facilitate the replacement of the modulating clutch unit, thereby increasing the general versatility of the vehicle.

In order to attain the above object, a power transmission system for a vehicle according to the present invention is a power transmission system for a vehicle, which transmits power from an engine to a traveling system by way of an input transfer unit for distributing the power to a working machine power output section and a traveling power output section, via a modulating clutch unit, a torque converter unit, and a transmission, and is characterized in that the modulating clutch unit and the torque converter unit are respectively disposed at the engine side and the transmission side with the input transfer unit therebetween, and are placed coaxially to be attachable and detachable.

According to the above configuration, the modulating clutch unit and the torque converter unit are individually attachable and detachable, therefore making it easy to repair, maintain, and check these units, and enhancing maintainability. Further, since the structure of the modulating clutch unit itself can be replaced, the modulating clutch unit suitable to use conditions can be easily mounted, therefore increasing the applicability of the vehicle and enhancing general versatility.

A clutch input shaft of the modulating clutch unit may be coupled to an output gear of the input transfer unit, and a clutch output shaft of the modulating clutch unit may pass the input transfer unit and may be coupled to an input shaft of the torque converter unit.

According to the above configuration, the modulating clutch unit is coupled to the output gear of the input transfer unit and the torque converter unit, for example, by means of a spline, therefore simplifying the structure of the coupled portion, increasing reliability, and reducing the cost.

Further, the modulating clutch unit may include a clutch housing attached to the input transfer unit to be attachable and detachable,

- an inner drum in a cylindrical form, which is rotatably supported by the clutch housing via a bearing and has a cylindrical input shaft of an inner spline at the input transfer unit side and a spline at the outer periphery thereof, an outer drum in a cylindrical form, which is placed outside the inner drum and has a spline at the inner periphery thereof, a friction plate pack placed between the spline at the outer periphery of the inner drum and the spline at the inner periphery of the outer drum,
- a modulating output shaft which is coupled to the outer drum, rotatably supported by the clutch housing via a bearing, and has an outer spline penetrating from the hollow inner diameter portion of the cylindrical input shaft to the input transfer unit side, and
- a compression piston which is supported by the modulating output shaft and compresses the friction plate pack, the cylindrical input shaft may be coupled to the input transfer unit to be attachable and detachable, and the outer spline of the modulating output shaft may be coupled to the torque converter unit to be attachable and detachable.

According to the above configuration, the input section and the output section of the modulating clutch unit are respectively coupled to the output section of the input transfer unit and the input section of the torque converter unit with separable splines, therefore making it easy to attach and detach them as assembly components.

Furthermore, the torque converter unit may include a torque-converter housing which is attached to the input transfer unit to be attachable and detachable and has a hollow cylindrical shaft therein,

- a stator fixed to the hollow cylindrical shaft, a pump element rotatably supported by the hollow cylindrical shaft via a bearing,
- an input shaft which is coupled to the pump element, rotatably supported by the input transfer unit via a bearing, and provided with an outer spline at the input transfer unit side, and a turbine element which is rotatably supported by the pump element via a bearing, placed nearer to the input transfer unit than the front end portion of the hollow cylindrical shaft, and provided with a hollow cylindrical output shaft at the inner periphery thereof,
- the outer spline of the input shaft may be connected to the modulating clutch unit to be attachable and detachable, and the hollow cylindrical output shaft may be connected to the transmission to be attachable and detachable.

According to the above configuration, the input section of the torque converter unit is coupled to the output section of the modulating clutch unit with the separable spline, therefore facilitating attachment and detachment as an assembly component.

BEST MODE FOR CARRYING OUT THE INVENTION

A preferred embodiment of the present invention will be particularly described below with reference to the attached drawings.

Figure 1:
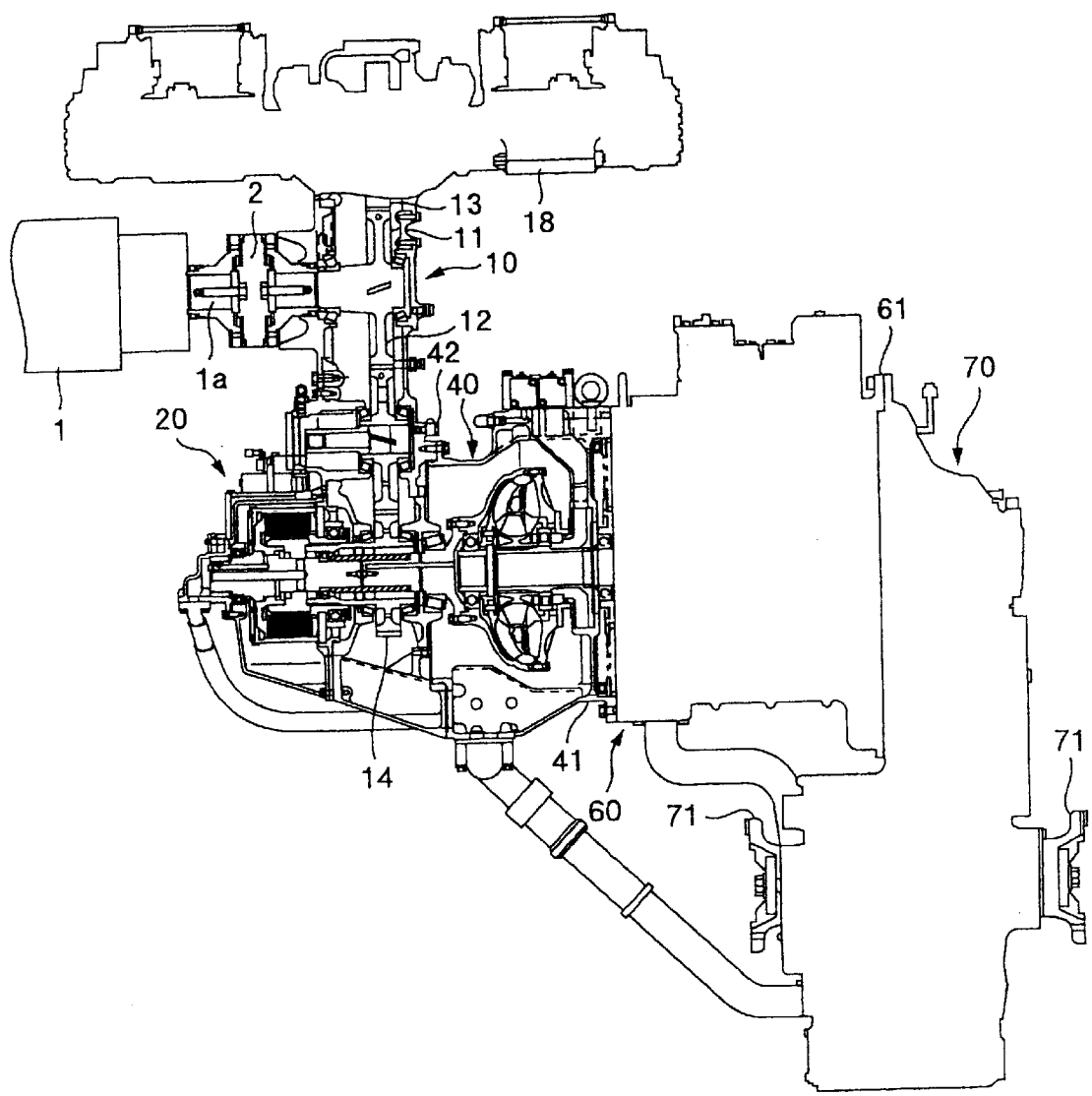
FIG. 1 is a diagram showing the outline of a power transmission system for a vehicle according to the present invention.

First, the outline of a power transmission system will be explained with reference to FIG. 1. An output shaft Ia of an engine 1 is coupled to an input gear 12 of an input transfer unit 10 by means of a joint 2. A plurality of gears, which are directly or indirectly meshed with the input gear 12, are incorporated in an input transfer housing 11 of the input transfer unit 10. The plurality of gears distribute the power inputted into the input gear 12 to each of devices such as a working machine hydraulic pump 18 and a modulating clutch unit 20 and drive it. The working machine hydraulic pump 18 is attached at the input transfer housing 11, and is driven by a first output gear 13 meshed with the input gear 12.

The modulating clutch unit 20 is attached to the input transfer housing 11 at the engine 1 side, specifically, below the joint 2 connected to the engine 1. The modulating clutch unit 20 is driven by a second output gear 14 via the gears meshed with the input gear 12. A torque converter unit 40 is attached to the input transfer housing 11, facing the modulating clutch unit 20, at a transmission 60 side, that is, at the opposite side to the modulating clutch unit 20. In addition, the torque converter unit 40 and the modulating clutch unit 20 are disposed on the same axis with the input transfer housing 11 between them.

The transmission 60 is attached to a torque-converter housing 41 of the torque converter unit 40, and is driven by the torque converter unit 40. An output transfer unit 70 is attached to a transmission housing 61 of the transmission 60 and is driven by the transmission 60, and the driving power thereof drives a traveling system (not shown) coupled to a joint 71.

Figure 2:
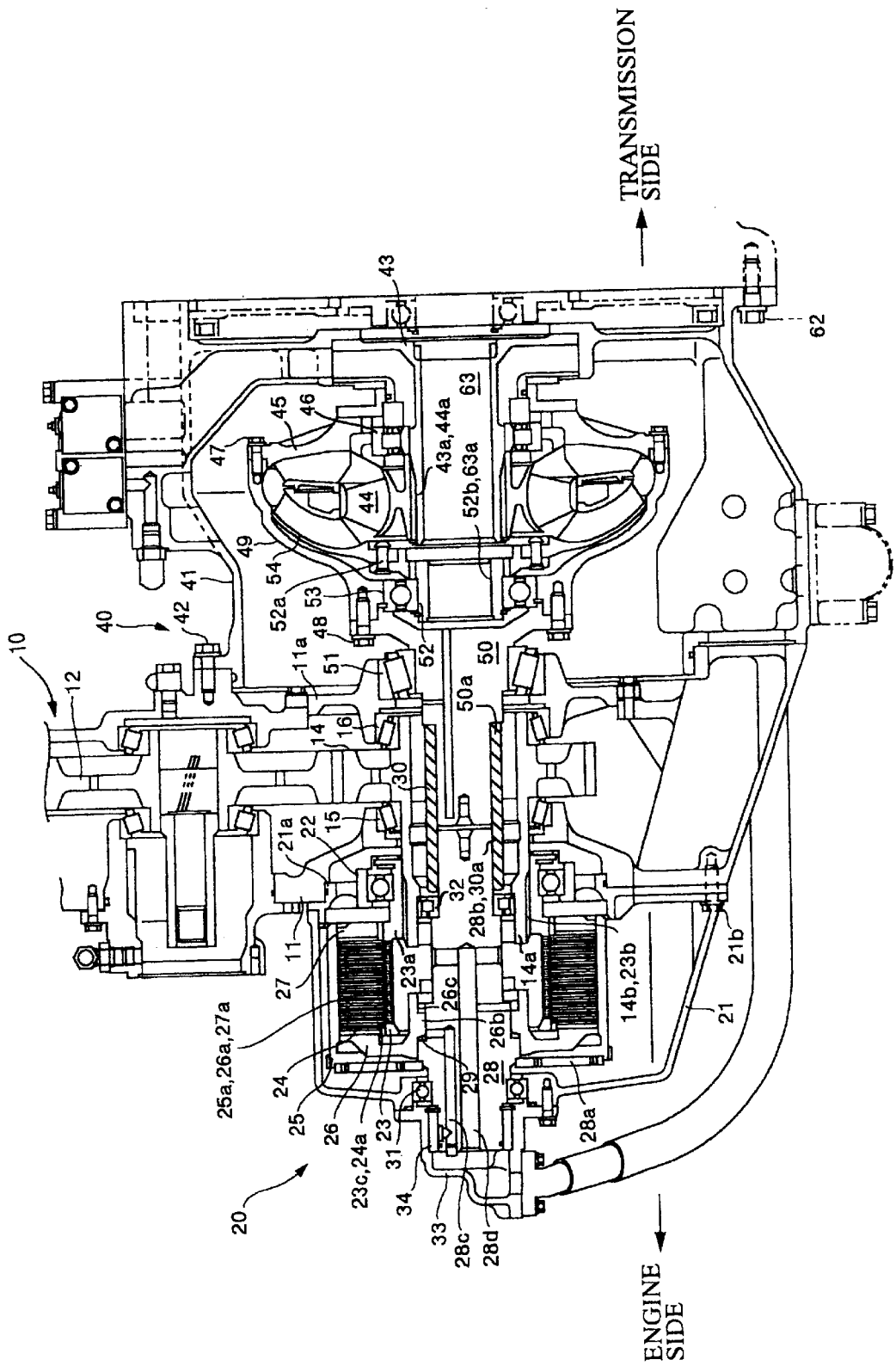
FIG. 2 is a sectional explanatory diagram of a modulating clutch unit and a torque converter unit of FIG. 1.
Figure 3:
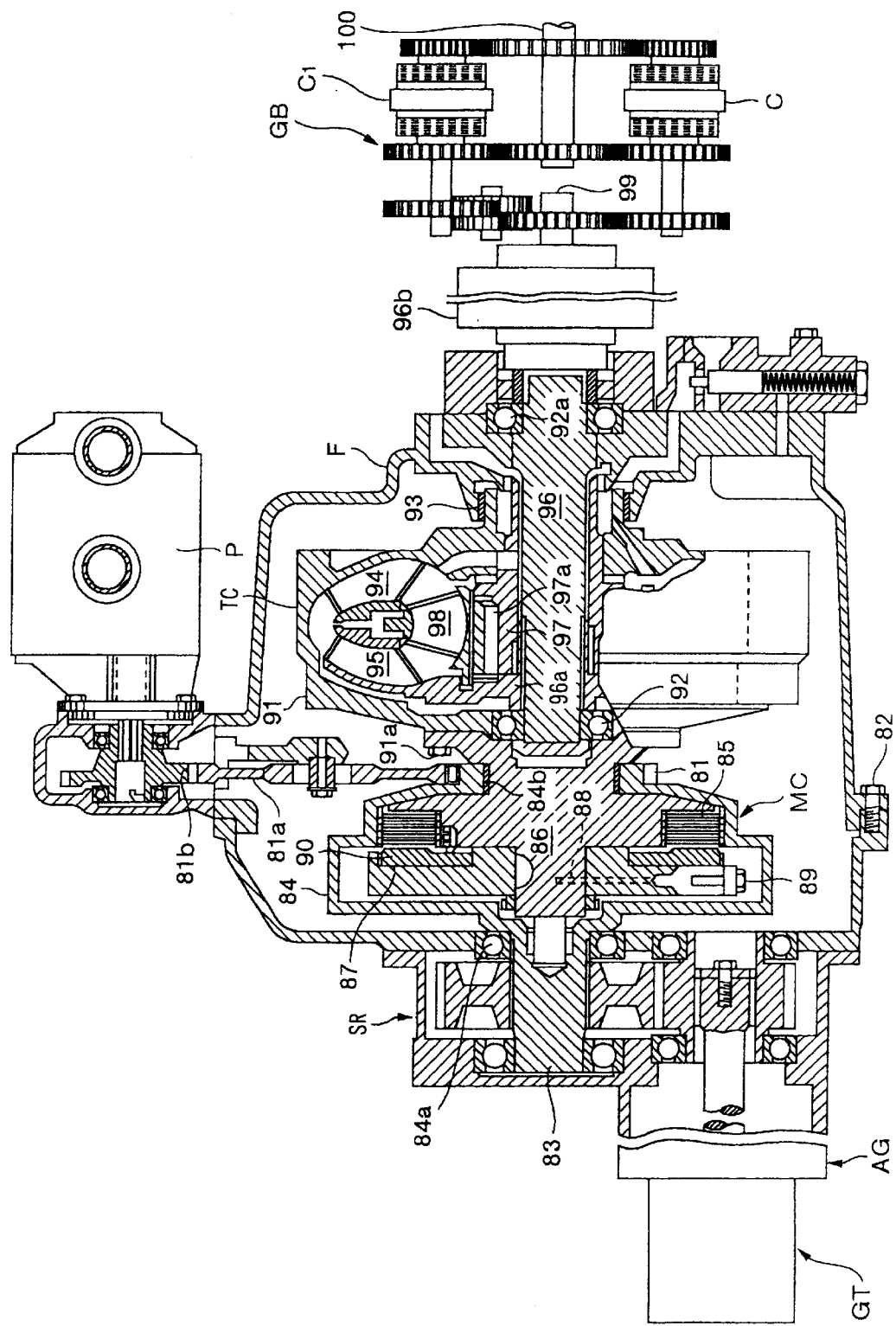
FIG. 3 is a sectional view of a modulating clutch and a torque converter of a prior art.

An output section of the input transfer unit 10 will be explained with reference to FIG. 2. The second output gear 14 is rotatably supported by a bearing 15 attached to the input transfer housing 11, and a bearing 16 attached to a retainer 11a which is fixed to the input transfer housing 11. The second output gear 14 has a cylindrical output shaft 14a with a spline 14b being formed, at the outer periphery of one end portion at the input transfer housing 11 side (specifically, the modulating clutch unit 20 side). The second output gear 14 is formed by a hollow shaft, and a modulating output shaft (clutch output shaft) 28 from the modulating clutch unit 20, a torque-converter input shaft 50 to the torque converter unit 40, and a cylindrical coupling 30 for coupling the modulating output shaft 28 and the torque-converter input shaft 50 are placed therein.

The modulating clutch unit 20 will be explained. The modulating clutch unit 20 is an assembly component, which is placed inside a clutch housing 21, and is attached on the surface of the input transfer housing 11 at the engine 1 side with a bolt 21b. A retainer 21a, which is attached to the rear portion of the clutch housing 21, is attached to the input transfer housing 11. An inner drum 23 is rotatably supported by a bearing 22 attached to the retainer 21a, and has a cylindrical input shaft (clutch input shaft) 23a with a spline 23b being formed, at one end portion side of the inner periphery.

The spline 23b is engaged with the spline 14b of the cylindrical output shaft 14a of the second output gear 14. A spline 23c formed at the outer periphery of the inner drum 23 is slidably engaged with a spline 24a formed at an inner periphery of a friction plate pack 24. An outer drum 25 is placed at the outer periphery of the friction plate pack 24. A spline 25a formed at the inner periphery of the outer drum 25 is slidably engaged with a spline 26a formed at the outer periphery of a piston 26, and a spline 27a formed at an outer periphery of a supporting plate 27 adjacent to the friction plate pack 24.

The outer drum 25 is fastened to a plate 28a fixed to the modulating output shaft 28, and rotates integrally with the modulating output shaft 28. The modulating output shaft 28 is supported by a bearing 31 attached to the clutch housing 21, and a bearing 32 attached to the inside of the cylindrical output shaft 14a of the second output gear 14, with a spline 28b being formed at the outer periphery of the front end portion thereof. The spline 28b is separably engaged with a spline 30a formed at the inner periphery of the cylindrical coupling 30.

The modulating output shaft 28 is provided with an oil passage 28c. The piston 26 is formed by a combination of a hollow cylindrical-shaped element and a disk-shaped element. Pressure oil is introduced into a pressure chamber 29 formed by the hollow cylindrical-shaped element of the piston 26 and the modulating output shaft 28 through a cover 33, a collar 34, and the oil passage 28c. The modulating output shaft 28 is closely inserted into an inner diameter portion 26b of the hollow cylindrical-shaped element. The disk-shaped element abuts to the friction plate pack 24. When the pressure oil is guided into the pressure chamber 29, the inner diameter portion 26b and an inner diameter portion 26c of the piston 26 moves to the right and upward on the modulating output shaft 28 to press the friction plate pack 24, thereby engaging the inner drum 23 and the outer drum 25. The modulating output shaft 28 is provided with an oil passage 28d, and lubricant oil guided from the cover 33 is distributed and supplied to each element.

The torque converter unit 40 will be explained. The torque converter unit 40 is placed in the torque-converter housing 41, made to be an assembly component, and attached to the input transfer housing 11 with a bolt 42. A hollow cylindrical shaft 43 is fixed to the torque-converter housing 41, and a spline 43a is formed at the outer periphery of the front end portion of the hollow cylindrical shaft 43. A spline 44a formed at an inner periphery of a stator 44 is engaged with the spline 43a, and the stator 44 is fixed at the hollow cylindrical shaft 43.

A pump element 45 is rotatably supported by a bearing 46 attached to the hollow cylindrical shaft 43, and is fastened to a casing 49 and a torque-converter input shaft 50 respectively with bolts 47 and 48. The torque-converter input shaft 50 is rotatably supported by a bearing 51 attached to the retainer 11a of the input transfer housing 11. A spline 50a is formed at the outer periphery of the front end portion of the torque-converter input shaft 50. The spline 50a is separably engaged with the spline 30a at the inner periphery of the cylindrical coupling 30.

A hollow cylindrical input shaft 52 is rotatably supported by a bearing 53 attached to the casing 49, and is fixed to a turbine element 54 with a rivet 52a. When the pump element 45 fixed at the input shaft 50 is rotated, a flow is caused inside a ring circuit of the torque-converter unit 40 to rotate the turbine element 54, thereby driving the hollow cylindrical input shaft 52. A spline 63a formed at an outer periphery of an input shaft 63 for the transmission 60 is separably engaged with a spline 52b formed at the inner periphery of the hollow cylindrical output shaft 52 to drive the input shaft 63.

The operation of the modulating clutch unit 20 will be explained with reference to FIG. 2. The power of the second output gear 14 is transmitted to the inner drum 23 through the spline 23b of the inner drum 23 engaged with the spline 14b of the cylindrical output shaft 14a. Here, on manipulating an operation device (not shown), pressure oil is guided into the pressure chamber 29 through the cover 33, the collar 34, and the oil passage 28c. When the pressure oil is guided into the pressure chamber 29, the inner diameter portions 26b and 26c of the piston 26 are moved to th e right on the modulating output shaft 28, and presses the friction plate pack 24 by the amount corresponding to the pressure value of the pressure oil to engage the inner drum 23 and the outer drum 25. During the engagement, rotational torque corresponding to the pressure value of the pressure oil is transmitted to the modulating output shaft 28. The power of the modulating output shaft 28 is transmitted to the cylindrical coupling 30 through the spline 30a of the cylindrical coupling 30 engaged with the spline 28b of the modulating output shaft 28.

Attachment/detachment of the modulating clutch unit 20 will be explained with reference to FIG. 2. The spline 23b of the inner drum 23 is separably engaged with the spline 14b of the second output gear 14 in an axial direction. The spline 28b of the modulating output shaft 28 is separably engaged with the spline 30a of the cylindrical coupling 30 in an axial direction. The bearing 32, which is mounted inside the cylindrical output shaft 14a of the second output gear 14 and supports the modulating output shaft 28, is made of a roller bearing, with the outer race and the inner race thereof being axially separable at a roller element. As a result, the modulating clutch unit 20 can be easily withdrawn toward the engine 1 side by loosening the bolt 21b with which the clutch housing 21 is fastened to the input transfer housing 11. Accordingly, the modulating clutch unit 20 can be easily detached as an assembly component without exerting an influence on the torque converter unit 40.

Next, the operation of the torque converter unit 40 will be explained with reference to FIG. 2. The power transmitted to the cylindrical coupling 30 is transmitted to the torque-converter input shaft 50 through the spline 50a of the torque-converter input shaft 50 engaged with the spline 30a. When the torque-converter input shaft 50 is driven, the pump element 45 coupled to the torque-converter input shaft 50 is rotated, and a flow is made inside the ring circuit of the torque converter unit 40, thereby rotating the turbine element 54 to drive the hollow cylindrical output shaft 52 coupled to the turbine element 54. The power of the hollow cylindrical output shaft 52 is transmitted to the input shaft 63 for the transmission 60 through the spline 63a of the transmission input shaft 63 of the transmission 60, which is engaged with the spline 52b.

Attachment/detachment of the torque converter unit 40 will be explained. The spline 50a of the torque-converter input shaft 50 is engaged with the spline 30a of the cylindrical coupling 30 to be axially separable. The spline 52b of the hollow cylindrical output shaft 52 is engaged with the spline 63a of the input shaft 63 for the transmission 60 to be axially separable. Further, the bearing 51 supporting the torque-converter input shaft 50 is made of a tapered roller bearing, with the outer race and the inner race thereof being axially (in a direction of the transmission 60 side) separable by the roller. Accordingly, the torque converter unit 40 can be easily withdrawn toward the transmission 60 side by loosening the bolt 42 with which the torque-converter housing 41 is fastened to the input transfer housing 11, and can be easily detached as an assembly component without exerting any influence on the modulating clutch unit 20. In this case, it may be suitable to separate the transmission 60 from the torque-converter housing 41 by previously loosening the bolt 62.

According to the above embodiment, the modulating clutch unit 20 and the torque-converter unit 40 are individually attachable and detachable, therefore making it easier to repair, maintain, and check these units, and enhancing maintainability. It is possible to change the structure of the modulating clutch unit 20 itself, which makes it easy to mount the modulating clutch unit 20 suitable for the use conditions, therefore increasing adaptability to vehicles and general versatility. In addition, the modulating clutch unit 20 is coupled to the second output gear 14 of the input transfer unit 10 and the torque converter unit 40 by the splines, therefore increasing reliability with the simple structure of the coupled portions at a lower cost.

What is claimed is:

1. A power transmission system for a vehicle, which transmits power from an engine to a traveling system by way of an input transfer unit for distributing the power to a working machine power output section and a traveling power output section, via a modulating clutch unit, a torque converter unit, and a transmission, comprising:

a coupling placed at an internal output shaft element for outputting traveling power to the outside from the inside of said input transfer unit, wherein said modulating clutch unit is attached to one side face of an input transfer housing of said input transfer unit and is attachably and detachably coupled to said internal output shaft element and said coupling, and wherein said torque converter unit is attached to the other side face of said input transfer housing and is attachably and detachably coupled to said coupling.

2. The power transmission system for a vehicle in accordance with claim 1:

wherein a clutch input shaft of said modulating clutch unit is coupled to an output gear of said input transfer unit; and wherein a clutch output shaft of said modulating clutch unit passes through said input transfer unit and is coupled to an input shaft of said torque converter unit.

3. The power transmission system for a vehicle as recited in claim 1, wherein said modulating clutch unit comprises:

a clutch housing attached to said input transfer unit to be attachable and detachable;

an inner drum in a cylindrical form, which is rotatably supported by said clutch housing via a bearing and has a cylindrical input shaft having an inner spline at said input transfer unit side and a spline at the outer periphery thereof;

an outer drum in a cylindrical form, which is placed outside said inner drum and has a spline at the inner periphery thereof;

a friction plate pack placed between the spline at the outer periphery of said inner drum and the spline at the inner periphery of said outer drum;

a modulating output shaft which is coupled to said outer drum, rotatably supported by said clutch housing via a bearing, and has an outer spline penetrating from a hollow inner diameter portion of said cylindrical input shaft toward said input transfer unit side, and a compression piston which is supported by said modulating output shaft and compresses said friction plate pack, wherein said cylindrical input shaft is coupled to said input transfer unit to be attachable and detachable, and wherein the outer spline of said modulating output shaft is coupled to said torque converter unit to be attachable and detachable.

4. The power transmission system for a vehicle as recited in claim 1, wherein said torque converter unit comprises:

a torque-converter housing which is attached to said input transfer unit to be attachable and detachable and has a hollow cylindrical shaft therein;

a stator fixed to said hollow cylindrical shaft;

a pump element rotatably supported by said hollow cylindrical shaft via a bearing;

an input shaft which is coupled to said pump element, rotatably supported by said input transfer unit via a bearing, and provided with an outer spline at the input transfer unit side; and a turbine element which is rotatably supported by said pump element via a bearing, placed nearer to said input transfer unit than the front end portion of said hollow cylindrical shaft, and provided with a hollow cylindrical output shaft at the inner periphery thereof, wherein the outer spline of said input shaft is connected to said modulating clutch unit to be attachable and detachable, and wherein said hollow cylindrical output shaft is connected to said transmission to be attachable and detachable.

* * * * *